United States Patent [19]

Jelinek

[11] 4,053,167
[45] Oct. 11, 1977

[54] SEAL FOR BALL BEARING SCREWS AND THE LIKE

[75] Inventor: Jerry George Jelinek, LaHabra, Calif.

[73] Assignee: Parker-Hannifin Corporation, Cleveland, Ohio

[21] Appl. No.: 733,710

[22] Filed: Oct. 18, 1976

[51] Int. Cl.² .................. F16J 15/16; F16H 55/22
[52] U.S. Cl. .................. 277/165; 277/167; 277/203; 74/459
[58] Field of Search .......... 308/187.1; 277/40, 41, 277/81 R, 84, 92, 94, 95, 142, 152, 165, 167, 203, 214; 74/459, 424.8 R, 388 PS

[56] References Cited

U.S. PATENT DOCUMENTS

| 2,249,141 | 7/1941 | Johnson | 308/187.1 X |
| 2,757,548 | 8/1956 | Smith et al. | 74/459 X |
| 3,116,931 | 1/1964 | Edwards | 74/459 X |
| 3,643,521 | 2/1972 | Nilsson | 74/459 |
| 3,669,460 | 6/1972 | Wysong | 277/165 X |
| 3,678,776 | 7/1972 | Patterson | 74/459 |

FOREIGN PATENT DOCUMENTS

| 693,131 | 7/1940 | Germany | 277/81 |
| 727,814 | 4/1955 | United Kingdom | 277/152 |

Primary Examiner—Robert S. Ward, Jr.
Attorney, Agent, or Firm—Donnelly, Maky, Renner & Otto

[57] ABSTRACT

A seal for a ball bearing score and the like comprising a ring of elastomeric material axially and angularly fixed to the nut so that an internal projection from the bore of the ring makes sliding sealed engagement with a line or a circumferentially narrow band of the thread groove of the screw from crest to crest thereof, and so that an internal one-turn helical rib from the bore of the ring makes sliding sealed engagement with the crest of the thread of said screw from one side of said projection to the opposite side thereof. The seal herein is further characterized in that the aforesaid internal projection is of circular cross section for sliding sealing engagement with a thread groove of any helix angle. The seal herein is yet further characterized in that in the case of a screw having a thread with a relatively wide crest, the aforesaid one-turn internal rib is engaged along the middle of the crest and terminates in rib portions which extend toward each other and are joined to opposite sides of the aforesaid internal projection.

10 Claims, 3 Drawing Figures

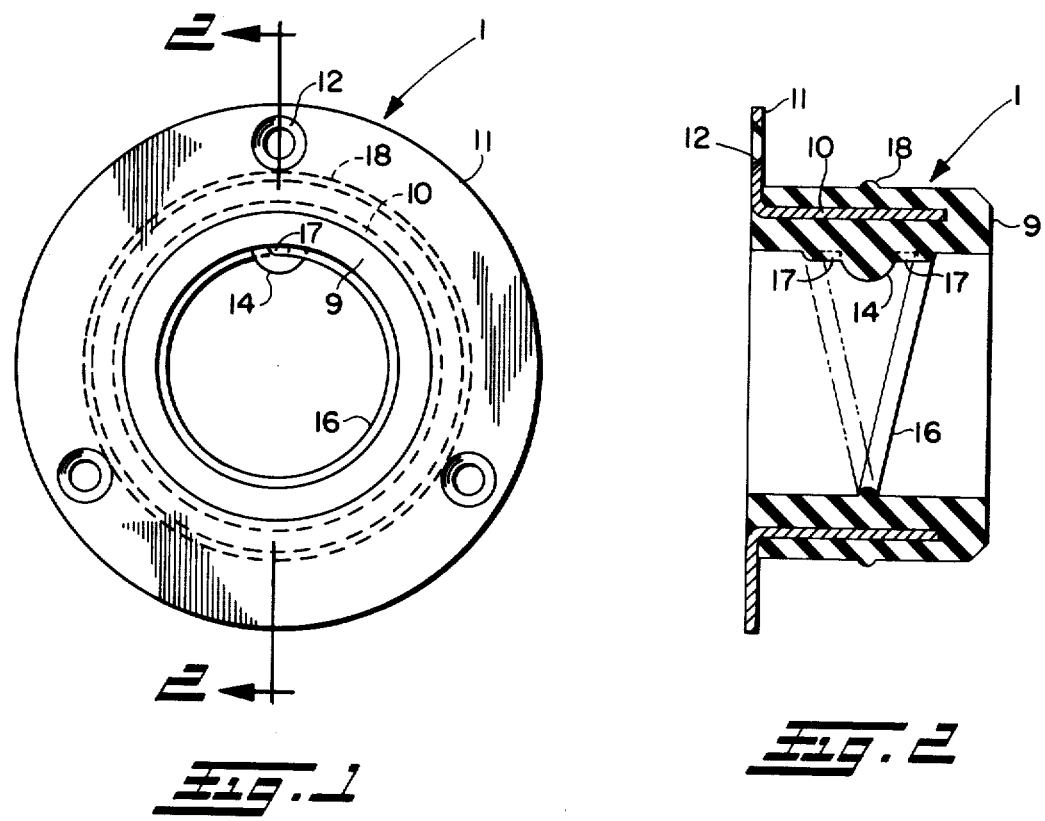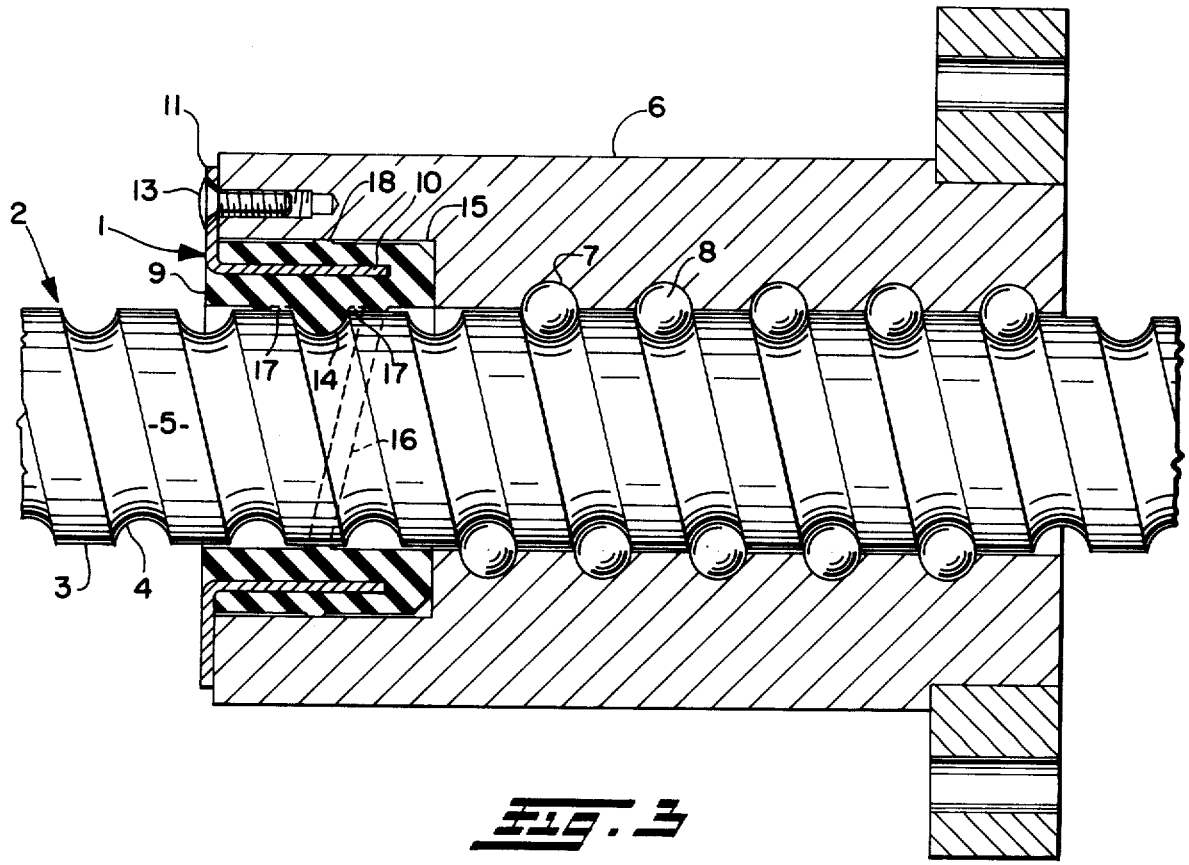

SEAL FOR BALL BEARING SCREWS AND THE LIKE

BACKGROUND OF THE INVENTION

Known thread seals as disclosed for example in the U.S. Pat. Nos. 2,706,656; 2,982,573; and 3,009,722 are suited only for static seal applications because the elastomeric rings thereof are in high pressure frictional engagement with the threads of a bolt or screw. In the U.S. Pat. No. 3,259,404 the thread seal is provided with three equally spaced projections shaped to engage the flanks and root of the thread whereby the bore of the ring need only be embedded partway into the crest of the thread. However, even if one projection registers with the thread groove, the other two projections will be subject to high pressure axial shearing forces by the flanks of the thread.

SUMMARY OF THE INVENTION

In contradistinction to known thread seals which are suitable only for static sealing purposes, the seal according to the present invention provides an effective low friction dynamic seal for a ball bearing screw and the like wherein relative rotation of the screw and nut effects relative linear motion thereof.

It is a principal object of this invention to provide a thread seal which makes low friction sliding sealing contact with a line or circumferentially narrow area of the thread groove from crest to crest irrespective of the helix angle of the thread and with the helical crest of the thread from one end to the other of said area.

It is another object of this invention to provide a thread seal for a thread having a relatively wide cylindrical crest, said seal having a one-turn narrow helical rib in sliding sealed engagement with the mid-portion of the crest which terminates in rib portions extending toward each other and joined to opposite sides of an inward projection of the seal having sliding sealed engagement with a circumferentially narrow band of the thread groove from crest to crest.

Other objects and advantages will appear from the ensuing description.

BRIEF DESCRIPTION OF THE DRAWING

FIG. 1 is an end elevation view of a thread seal according to the present invention;

FIG. 2 is a cross section view taken substantially along the line 2—2, FIG. 1; and FIG. 3 is a central longitudinal cross section view showing the seal of FIGS. 1 and 2 as installed in the nut of a ball bearing screw.

DETAILED DESCRIPTION OF A PREFERRED EMBODIMENT

The thread seal 1 herein is shown in connection with a ball bearing screw assembly 2 which comprises a screw 3 having a helical groove 4 of semicircular cross section with a relatively wide cylindrical crest 5 and a nut 6 having a mating helical groove 7 of semicircular cross section, there being a series of balls 8 engaged in said grooves 4 and 7. As well known in the art, means (not shown) will be provided for recirculation of the balls 8 from one end to the other of the nut groove 7. In a ball bearing screw 2 of the character indicated, relative rotation of the screw 3 and nut 6 will cause relative linear motion thereof.

The thread seal 1 for such ball bearing screw assembly 2 comprises a ring 9 of elastomeric material which may be bonded to a retainer 10 and the retainer flange 11 has holes 12 for mounting screws 13 to retain the ring 9 coaxially in said nut 6 and in predetermined angular and axial position in the nut 6. The angular and axial orientation of the ring 9 is such that the hemispherical inward projection 14 will make low friction sliding sealed engagement with a circumferentially narrow band of the thread groove 4 from crest to crest.

The nut 6 has a counterbore 15 of depth substantially equal to the length of the ring 9 from the axially inner end thereof to the flange 11 of the retainer 10, and when the seal 1 is properly angularly oriented and axially positioned as shown, the inward projection 14 will make substantially uniform pressure contact with the thread groove 4 from crest to crest irrespective of the helix angle of the groove 4.

In low friction sliding sealed engagement with the mid-portion of the crest 5 of the thread of the screw 3 is a one-turn narrow internal helical rib 16 of the ring 9, said rib 16 terminating in rib portions 17 which extend toward each other and which join opposite sides of the inward projection 14.

The exterior of the ring 9 is preferably provided with a narrow circular rib 18 which makes sealing engagement with the counterbore 15 when the seal 1 is installed as shown in FIG. 3.

In a low pressure installation as for example where the seal is used primarily to prevent leakage of ball bearing lubricant and to prevent dust and foreign matter from reaching the balls, the retainer portion may be omitted.

The seal 1 herein provides an efficient seal at high hydraulic pressures of 2500 psi or more and, of course, in low pressure installations the retainer 10 may be omitted. Furthermore, it is to be understood that the angular orientation of the seal may be effected other than by the screw and flange means 13 and 11 shown, such as a key molded on the seal to engage in a keyway in the nut.

Although the present invention has been illustrated and described in connection with a ball bearing screw assembly 2, it is to be understood that the principles of the invention may be used with a screw and nut assembly in which the interengaged threads are, for example, Acme, V, or square threads. In the case of Acme and V threads, the inward projection 14 will be of frustoconical shape to engage the thread groove from crest to crest, and in the case of square threads the inward projection 14 will be cylindrical to engage the square thread groove from crest to crest.

It will be apparent to those skilled in the art that in some installations slight leakage of the seal 1 may be desired and, of course, in such case the projection 14 and helical rib 16 and rib portions 17 may be modified to be in close proximity to the thread groove 4 and crest 5 to permit minute leakage.

The embodiments of the invention in which an exclusive property or privilege is claimed are defined as follows:

1. A nut and screw assembly wherein interengaged threads of said nut and screw effect relative axial movement thereof in response to relative rotation thereof, the combination therewith of a ring of elastomeric material axially and angularly fixedly secured to said nut; said ring having an internal one-turn helical rib in sliding sealed engagement with the crest of the thread of said screw and terminating in end portions having sliding sealed engagement with said crest to its junctions with the thread groove therebetween; said ring having a radially inwardly extending projection between said end portions having sliding sealed engagement with said thread groove from crest to crest thereof.

2. The nut and screw assembly of claim 1 wherein said radially inwardly extending portion is of circular cross section to make such sliding sealed engagement with the thread groove at any helix angle of said thread.

3. The nut and screw assembly of claim 1 wherein said screw has crests of substantial axial width with said helical rib being engaged with an intermediate portion of said crest; and wherein said end portions extend toward each other to said junctions and to said projection.

4. The nut and screw assembly of claim 1 wherein said assembly is a ball bearing screw assembly with ball bearings between mating helical grooves of substantially semicircular cross section in said nut and on said screw; and wherein said radially inwardly extending projection is substantially hemispherical.

5. The nut and screw assembly of claim 1 wherein said ring is secured to a retainer to resist distortion of said ring even under high fluid pressures acting on said rib and projection.

6. The nut and screw assembly of claim 1 wherein said nut has a counterbore to receive said ring in fluid-tight relation; and wherein said nut and ring have mating surfaces to axially retain said ring in said counterbore and to prevent rotation of said ring in said counterbore thus to position said projection in register with said thread groove.

7. The nut and screw assembly of claim 6 wherein said ring between its ends has a radially outwardly projecting rib therearound in sealed engagement in said counterbore.

8. A seal for a nut and screw assembly wherein interengaged threads thereof cause relative axial movement of said nut and screw in response to relative rotation thereof, said seal comprising a ring of elastomeric material adapted to be axially fixedly and nonrotatably secured to said nut in coaxial relation around said screw; said ring having an internal one-turn helical rib adapted to have sliding sealed engagement with the crest of the thread of said screw, and a radially inwardly extending projection between the ends of said helical rib adapted to make sliding sealed engagement with the thread groove of said screw from crest to crest between said end portions; said end portions being integrally joined to opposite sides of said projection to seal the junctions of said thread groove with said crest.

9. The seal of claim 8 wherein said projection is of circular cross section to seal against the thread groove irrespective of the helix angle of said thread.

10. The seal of claim 8 wherein said projection is substantially hemispherical for sliding sealed engagement with the thread groove of a ball bearing screw.

* * * * *